United States Patent Office 3,436,659
Patented Apr. 1, 1969

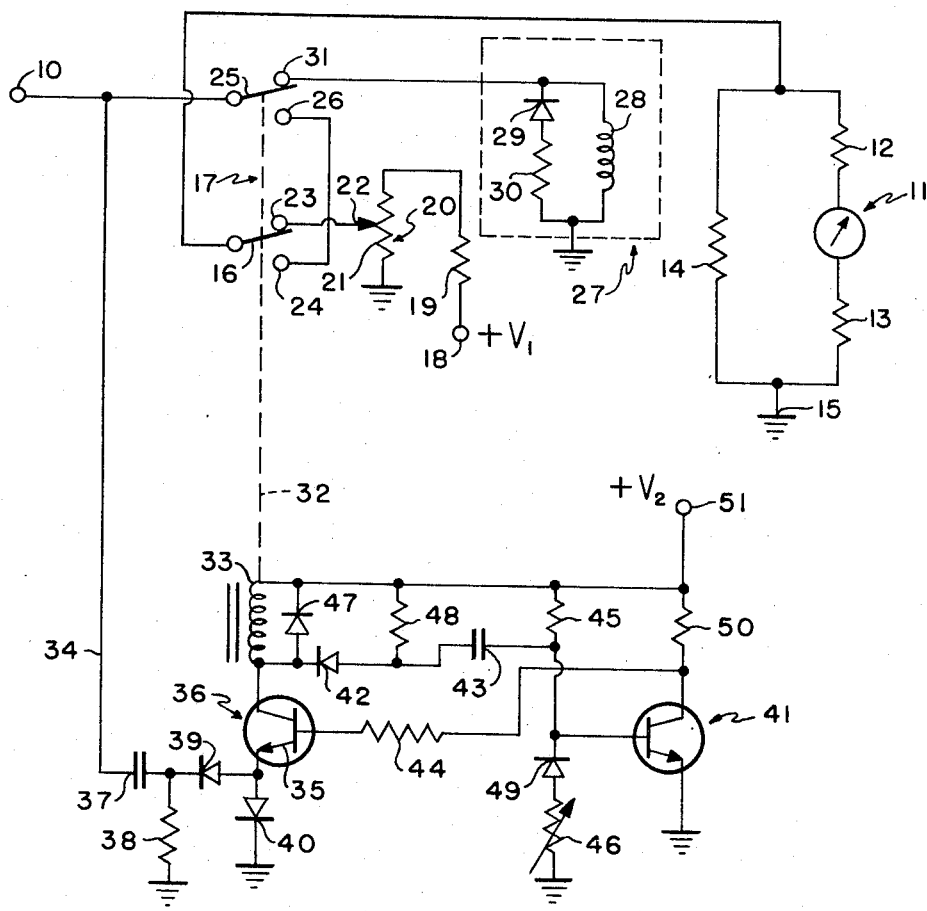

3,436,659
METER CIRCUIT INCLUDING SYNCHRONIZED SWITCHING MEANS FOR MEASURING THE "OFF" CURRENT IN A TRAIN OF PULSES
Stevan W. Speheger, Bluffton, Ind., assignor to Avco Corporation, Richmond, Ind., a corporation of Delaware
Filed Apr. 20, 1966, Ser. No. 543,851
Int. Cl. G01r *19/00, 19/60;* H03k *17/00*
U.S. Cl. 324—102          1 Claim

ABSTRACT OF THE DISCLOSURE

This is a metering system for measuring the magnitude of current from a pulse source during the "off" intervals of an incoming train of pulses from the source. It comprises selectors so arranged that during the "on" period of the pulse train a load is coupled to the pulse source and a source of reference current is coupled to a meter. During the "off" period of the pulses the pulse source is connected to the meter. The meter and the load have equivalent direct current resistance and the magnitude of the reference current is known, so that the readings of the meter during the "off" period furnish a comparison between the reference current and the "off" current of the incoming pulse train. These connecting operations are performed by selectors which are ganged and acuated by means synchronized to the repetition rate of the incoming pulses.

---

The present invention relates to measuring instruments and provides a circuit for quantitatively determining the magnitude of residual current during the "off" period of a pulse train. It has been found in utilizing solid state switching circuitry in a pulse driver configuration that a small leakage current exists even when a transistor is "off." In certain applications, which for security reasons will not be described in detail, it is necessary constantly to monitor this leakage current in order to assure that it does not exceed a predetermined level. The principal object of the present invention is to provide this constant monitor.

Another object of the invention is to provide a measuring instrument, for performing the above-described function, which does not suffer from one or more of the following disadvantages and limitation:

(1) The requirement of high impedance vacuum tube circuitry;
(2) Temperature stabilization difficulties;
(3) Security problems, incident to the display of the incoming wave shape, which display characterizes the use of oscilloscope techniques;
(4) The introduction of factors which load or otherwise interfere with the performance of an over-all system utilizing the required measuring device; and
(5) Elaborate circuitry.

For a better understanding of the invention, together with other and further objects, advantages, and capabilities thereof, reference is made to the following description of the accompanying drawing, the single figure of which is a circuit schematic of a preferred form of residual current checker in accordance with the invention.

The pulse wave train which is monitored appears in the input circuit comprising high potential terminal 10 and a grounded low potential terminal. The invention functions quantitatively to determine the residual current during the "off" period in this repetitious pulse train period. The checker in accordance with the invention provides a visual meter indication that the residual current is either less than, equal to, or greater than a predetermined reference current value. The principal components of the circuit herein shown comprise a conventional d'Arsonval type meter 11, series and shunt meter resistors, a fast-acting relay, transistorized switching circuitry, and a current reference source.

In series with the meter 11 is a resistor 12. The internal resistance of the meter 11 is shown as a resistor 13. Resistor 14 is in shunt with the meter and resistor 12. The low potential terminal of the meter network is grounded at 15, and the high potential terminal is connected to the movable switch blade 16 of a double-pole, double-throw relay 17. The values of the resistors 12 and 14 are so selected with reference to the internal resistance 13 of the meter 11 that the current reference provides a predetermined fractional scale deflection of the meter. The meter network comprising the elements 11–15 provides the direct current equivalent resistance of what is referred to as the "load," hereinafter described. The value of current represented by the fractional deflection is established during initial calibration and need not be known by the operator. A reference source of current (not shown) is connected to an input circuit which comprises input terminal 18 and ground, across which terminals there is disposed a potentiometer network comprising resistor 19 and the potentiometer proper 20, which includes a resistor 21 and an adjustable contact 22. In the position of the contacts illustrated in the drawing, a ciucuit is made from the meter network, via blade 16 and fixed contact 23, to the reference current source, i.e., the meter network is connected to the reference current source. Now, when contact 16 is thrown to a position at which it is in contact with fixed contact 24, and when blade 25 is correspondingly encircuited with fixed contact 26, then in that case the pulse input is connected via the elements 25, 26, 24, and 16 to the meter network. If the deflection of meter 11 is the same as when the reference current was being measured, then the residual current being monitored in the pulse input is equal to the reference current.

During the intervals of time when the pulse input is not being monitored, such pulse input is applied to the "load," here shown within the dashed line 27. It has been pointed out that the meter network stimulates the load. The nature of the load here involved and its parameters are not significant, except that it must be passive, and therefore that here illustrated at 27 is furnished by way of example, not limitation. As here shown it comprises two parallel branches, one of which is an inductance 28, and the other of which is a series combination of a diode 29 and a resistor 30, these two branches being connected between fixed contact 31 of the double-throw, double-pole switch and ground.

Now let the switch 17 briefly be considered. It comprises two movable blades 16 and 25 ganged by any suitable mechanical expedient 32. The pulse input terminal 10 is connected to blade 25. Blade 25 is movable selectively either to fixed contact 31, to connect the pulse input to the load 27, or to the fixed contact 26. The contact between elements 25 and 26 partially establishes connection of the pulse input to the meter network, via 26, 24, and 16. The blade 16 is connected to the meter network and is movable selectively either to a position in contact with fixed contact 23, at which it couples the meter network to the reference source, or a position in contact with fixed contact 24, where it completes the connection of the pulse input to the meter network. It should be noted that, when the pulse input is connected to the load, the meter network is connected to the reference current source. When the pulse input is connected to the meter network, the reference current source is out of circuit, because contact 23 is open.

The switching means 17 comprises what are referred to as a first and second selector. The first selector has a first common terminal 25 connected to the pulse source. It also has a first selectable terminal 31 connected to the load. Further, it has a second selectable terminal 26.

The second selector has what is referred to as a second common terminal 16 connected to the meter and also a third selectable terminal 23 connected to the reference source. The second selector also has what is referred to as a fourth selectable terminal 24 which is connected to the second selectable terminal 26.

The two-position ganged expendient 32 is a part of a relay which is activated by coil 33, which is controlled by switching circuitry now described. This switching circuitry is activated by the input pulse train, to which it is coupled by conductor 34. Power is supplied to the switching circuitry from a voltage source (not shown) coupled to the circuit at terminal 51. The pulse train is applied to the emitter 35 of a transistor 36 via an input network comprising series capacitor 37, shunt resistor 38, series diode 39, and shunt diode 40. The pulses are differentiated by the RC network 37, 38, and diode 39 passes only the negative-going waveforms. The combination of elements 37 and 38 presents a high impedance to the pulse input, and therefore produces a negligible shunting effect on the load. Conversely, the load does not adversely shunt the switching circuit input, because the differentiator 37, 38 is primarily sensitive to voltage changes and requires very little current.

The switching circuitry is a monostable multivibrator comprising transistors 36 and 41, both connected in the common-emitter configuration, the emitter 35 of transistor 36 being coupled to ground via diode 40 and the emitter of transistor 41 being grounded. The collector output of transistor 36 is coupled to the base input of transistor 41 via diode 42 and capacitor 43. The collector output of transistor 41 is coupled to the base of transistor 36 via resistor 44. Coil 33 is shunted by transient suppression diode 47. The principal time constant for the monostable multivibrator is provided by capacitor 43 and resistors 46 and 45, they being in circuit between the high potential terminal of the collector load resistor 50 and ground, and they being in series with a diode 49, the junction point between this diode and resistor 45 being coupled to the base of transistor 41.

Diode 40 is utilized in triggering the monostable multivibrator. Its high reverse resistance permits the emitter 35 to be pulled below ground, which allows transistor 36 to conduct, starting the timing cycle. The small forward resistance of diode 40 provides a low impedance in the collector circuit. Coil 33 is the collector load for transistor 36. Coil 33 is further shunted by a series combination of resistor 48 and diode 42, which acts as a gate to assure phase-switching action of transistor 36.

The function of diode 49 is to permit capacitor 43 to charge from a negative state at a rate controlled by resistor 46. When the right side of capacitor 43 reaches ground potential, diode 49 becomes reverse-biased, and the charging of capacitor 43 is completed through resistor 45, whereupon transistor 41 becomes conductive and transistor 36 is turned off.

It will be understood that the meter network is switched between the reference current source and the incoming pulses at the repetition rate of the input pulses. It is reiterated that the input pulses are differentiated by the network 37, 38. Diode 39 passes only the negative-going output, which triggers the emitter circuit of transistor 36, energizing coil 33 and tripping the relay so that the pulse input line is connected to the meter network. Thus the meter network is synchonously switched between the reference current and the pulse "off" current at the rate of the incoming pulses. Since the meter has been calibrated in accordance with the reference, an upward vibration of the indicator needle occurs if the pulse "off" current exceeds the reference. A downward deflection occurs if the pulse "off" current is less than the reference. The fast-acting phase-switching relay minimizes the slight downward deflection when the input residual current and the reference are precisely equal.

While it is not the intention to be limited to the specific set of parameters here presented, the following have been found useful in one embodiment of the in-invention:

| | |
|---|---|
| Relay 33 | Struthers-Dunn FC-215 Special. |
| Transistors 36 and 41 | Type 2N2219. |
| Diodes 39, 42, 49, and 40 | Type 1N914. |
| Diode 29 | Type 1N546. |
| Diode 47 | Type 1N484. |
| Internal resistance 13 of meter 11 | 100 ohms. |
| Meter 11 | Type 0–1 D.C. ma. Weston 301–57. |
| Resistor 12 | Small; may optionally be omitted. |
| Resistor 14 | 100 ohms. |
| Resistor 38 | 3900 ohms. |
| Resistor 46 | 500 ohm potentiometer. |
| Resistor 48 | 10,000 ohms. |
| Resistor 20 | 500 ohm potentiometer. |
| Resistor 45 | 56,000 ohms. |
| Resistor 50 | 820 ohms. |
| Resistor 44 | 22,000 ohms. |
| Resistor 30 | 100 ohms. |
| Resistor 21 | 500 ohms. |
| Resistor 19 | 5600 ohms. |
| Capacitor 37 | 1000 picofarads. |
| Capacitor 43 | 10 microfarads. |
| Coil 28 | 1.5 henries; 50 ohms D.C. resistance. |

I claim:
1. A metering device for measuring the magnitude of current from a pulse source during the "off" intervals of an incoming train of pulses from said source comprising
   a source of reference current;
   a load;
   a meter; a switching circuit including,
   a first selector means having a first common terminal connected to the pulse source and also having a first selectable terminal connected to the load and a second selectable terminal, and
   a second selector means having a second common terminal connected to the meter and also having a third selectable terminal connected to the reference source and a fourth selectable terminal, the second and fourth selectable terminals being connected to each other;
   the two selector means being mechanically ganged and having two positions of operation;
   the first selector means in its first position coupling the pulse source to the load during the "on" period of the pulse train and the second selector means in its first position then coupling the source of reference current to the meter;
   the first and second selector means in the second position cooperating to couple the pulse source to the meter during the "off" period of the pulses, the meter and the load having equivalent direct current resistance so that the meter furnishes a comparison between the reference current and the "off" current of the incoming pulse train; and means synchronized to the repetition rate of the incoming pulses for actuating the ganged selector means to the first position during "on" period of the pulse train and to the second position during the "off" period of the pulse train.

References Cited

UNITED STATES PATENTS

| | | | |
|---|---|---|---|
| 2,467,844 | 4/1949 | Michel | 324—102 XR |
| 2,805,394 | 9/1957 | Hermach | 324—106 |
| 3,273,059 | 9/1966 | Andresen et al. | 324—106 |
| 3,277,371 | 10/1966 | Marcus et al. | 324—158 |
| 3,289,081 | 11/1966 | Brunetto | 324—158 |

RUDOLPH V. ROLINEC, *Primary Examiner.*

G. R. STRECKER, *Assistant Examiner.*

U.S. Cl. X.R.

324—103; 328—150